(12) United States Patent
Lourenco et al.

(10) Patent No.: US 8,429,932 B2
(45) Date of Patent: Apr. 30, 2013

(54) METHOD FOR SELECTIVE EXTRACTION OF NATURAL GAS LIQUIDS FROM "RICH" NATURAL GAS

(76) Inventors: Jose Lourenco, Edmonton (CA); MacKenzie Millar, Edmonton (CA)

( * ) Notice: Subject to any disclaimer, the term of this patent is extended or adjusted under 35 U.S.C. 154(b) by 588 days.

(21) Appl. No.: 12/373,670

(22) PCT Filed: Jul. 13, 2007

(86) PCT No.: PCT/CA2007/001248
§ 371 (c)(1),
(2), (4) Date: Jan. 13, 2009

(87) PCT Pub. No.: WO2008/006222
PCT Pub. Date: Jan. 17, 2008

(65) Prior Publication Data
US 2009/0249829 A1   Oct. 8, 2009

(30) Foreign Application Priority Data
Jul. 13, 2006  (CA) ..................................... 2552327

(51) Int. Cl.
*F25J 3/00* (2006.01)
*B01D 53/00* (2006.01)
(52) U.S. Cl.
USPC ................... 62/632; 62/635; 62/50.2; 95/288
(58) Field of Classification Search .............. 62/618, 62/620, 625, 632, 635
See application file for complete search history.

(56) References Cited

U.S. PATENT DOCUMENTS

| | | | | |
|---|---|---|---|---|
| 3,152,194 A | * | 10/1964 | Arimont et al. | 62/632 |
| 3,367,122 A | * | 2/1968 | Tutton | 62/630 |
| 3,754,405 A | | 8/1973 | Rosen | |
| 3,846,993 A | * | 11/1974 | Bates | 62/625 |
| 4,279,130 A | | 7/1981 | Finch | |
| 4,424,680 A | | 1/1984 | Rothchild | |
| 4,430,103 A | | 2/1984 | Gray | |
| 5,137,558 A | | 8/1992 | Agrawal | |
| 5,329,774 A | * | 7/1994 | Tanguay et al. | 62/612 |
| 6,517,286 B1 | | 2/2003 | Latchem | |
| 6,932,121 B1 | | 8/2005 | Shivers, III | |
| 2003/0051875 A1 | | 3/2003 | Wilson | |

FOREIGN PATENT DOCUMENTS

| | | |
|---|---|---|
| CA | 2 318 802 A1 | 8/1999 |
| CA | 2 467 338 A1 | 7/2003 |
| EP | 0482222 A1 | 4/1992 |
| JP | 05263998 A | 10/1993 |
| RU | 2232342 C1 | 7/2004 |
| WO | 03/095914 A1 | 11/2003 |
| WO | 2004/010480 A1 | 1/2004 |
| WO | 2006/019900 A1 | 2/2006 |
| WO | 2006/036441 A1 | 4/2006 |

* cited by examiner

*Primary Examiner* — John Pettitt
*Assistant Examiner* — Ignacio E Landeros
(74) *Attorney, Agent, or Firm* — Christensen O'Connor Johnson Kindness, PLLC

(57) ABSTRACT

A method for selective extraction of natural gas liquids from "rich" natural gas. The method involves interacting a rich natural gas stream with Liquid Natural Gas (LNG) by mixing Liquid Natural Gas into the rich natural gas stream to lower the temperature of the rich natural gas stream to a selected hydrocarbon dew point, whereby a selected hydrocarbon liquid carried in the rich natural gas stream is condensed.

5 Claims, 4 Drawing Sheets

METHOD FOR SELECTIVE EXTRACTION OF NATURAL GAS LIQUIDS FROM "RICH" NATURAL GAS

FIELD OF THE INVENTION

The present invention relates to a method for selective extraction of natural gas liquids from "rich" natural gas

BACKGROUND OF THE INVENTION

Natural gas coming from a producing well contains many natural gas liquids (NGLs) that are commonly removed. The removal of natural NGLs usually takes place in a relatively centralized processing plant. The objective is to reduce the hydrocarbon dew point to prevent problems in the pipelines from liquid fallout. To remove NGLs, there are three common processes; Refrigeration, Lean Oil Absorption and Cryogenic.

With Refrigeration, a refrigeration plant is employed to provide cold to lower the temperature of the natural gas. Refrigeration is able to extract a large percentage of propane and most of the butane and heavier components.

With Lean Oil Absorption, an absorbing oil with an affinity for NGLs is brought into contact with natural gas in a contact tower where it soaks up a high proportion of NGLs. The "rich" absorption oil, now containing NGLs exits the absorption tower. This "rich" mixture of absorbing oil and NGLs is chilled to −30 F to separate the NGLs and absorbing oil. This process can extract 90% of the propane and heavier hydrocarbons and about 30% of the ethane.

The cryogenic process enables higher recoveries of ethane. The first generation cryogenic plants were able to extract up to 70% of the ethane from the gas, since the early 1990s, modifications to the cryogenic process have allowed ethane recoveries up to 99% extraction level. This increase in recovery comes with higher operating costs. There are a number of different ways to chill the gas the one most commonly used is the turbo expander process. In this process external refrigerants are used to cool the natural gas stream, then an expansion turbine is used to rapidly expand the chilled gases, which causes the temperature to drop significantly. This rapid temperature drop condenses ethane and other hydrocarbons in the gas stream while maintaining methane in a gaseous form. Operations of gas processing plants in reduced recovery modes is difficult, the plants are typically designed to achieve high recoveries of all the NGLs and are not designed to recover only pentanes and heavier or only butanes.

SUMMARY OF THE INVENTION

There is provided a method for selective extraction of natural gas liquids from "rich" natural gas. The method involves interacting a rich natural gas stream with Liquid Natural Gas by mixing Liquid Natural Gas into the rich natural gas stream to lower the temperature of the rich natural gas stream to a selected hydrocarbon dew point, whereby a selected hydrocarbon liquid carried in the rich natural gas stream is condensed.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred method will now be described with reference to FIG. 1.

Figure 1:
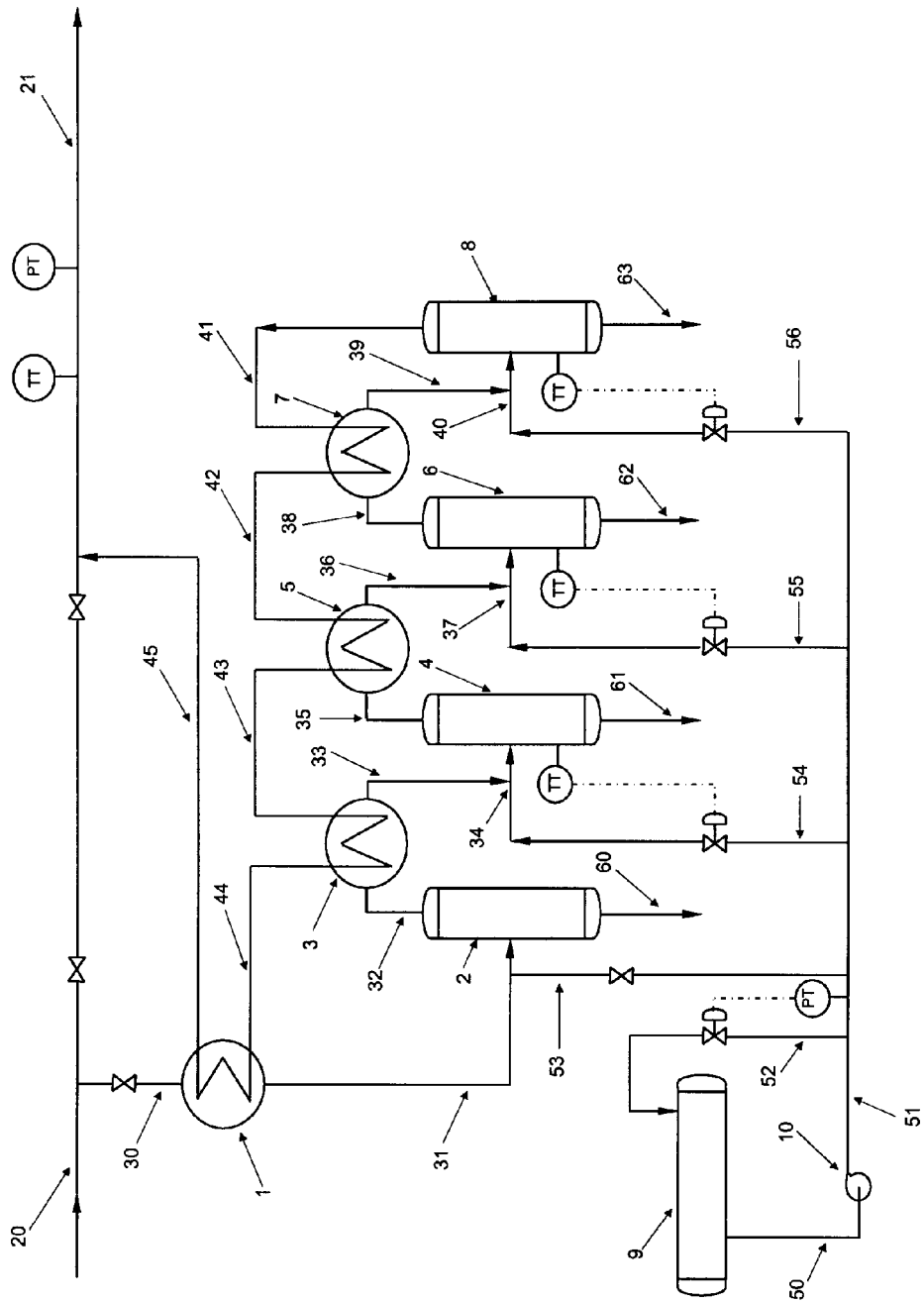
FIG. 1 is a schematic diagram of a facility equipped with liquid natural gas direct cooling in accordance with the teachings of the present invention.

Referring to FIG. 1, "rich" natural gas stream 20 is straddled into stream 30 for pre-cooling in heat exchanger 1. The cooling is provided by the counter current flow of "lean" gas stream 44. The now colder stream 31 then enters separator 2 where water and heavy hydrocarbons are condensed and separated from lighter fractions (hydrocarbons, carbon dioxide, nitrogen, etc.). The desired operating temperature conditions required for this separation is aided on through start-up stream line 53 until reaches the pre-set temperature. The separated heavier fractions exit separator vessel 2 through line 60. The lighter fractions exit through line 32 which then enters heat exchanger 3 for further cooling. The colder stream 33 now enters stream 34 where it is mixed with a pre-set temperature controlled LNG stream 54 to achieve the desired temperature for extraction of propane in separator vessel 4. The condensed and separated propane exits separator vessel 4 through line 61. The separated lighter fractions leave separator 4 through line 35 for further cooling in heat exchanger 5. The colder stream 36 now enters stream 37 where it is mixed with a pre-set temperature controlled LNG stream 55 to achieve the desired temperature for extraction of carbon dioxide in separator vessel 6. The condensed and separated carbon dioxide exits separator vessel 6 through line 62. The separated lighter fractions leave separator 6 through line 38 for further cooling in heat exchanger 7. The colder stream 39 now enters stream 40 where it is mixed with a pre-set temperature controlled LNG stream 56 to achieve the desired temperature for extraction of ethane in separator vessel 8. The condensed and separated ethane exits separator vessel 8 through line 63. The separated lighter fractions, "lean gas", leave separator 8 through line 41 for pre-heating in heat exchanger 7. The warmer stream 42 now enters heat exchanger 5 where it picks up additional heat to exit as a warmer stream 43. It then enters heat exchanger 3 where it picks up additional heat and exit as a warmer stream 44. Finally it enters heat exchanger 1 where stream 45 reaches a temperature close to the pipeline transmission gas temperature before re-injection. The pressure is supplied by LNG pump 10. The LNG is stored in vessel 9 and fed to pump 10 via line 50. The pressurized LNG is transported through line 51 for temperature control at each separator. Stream 53 provides LNG for process start-up.

Figure 2:
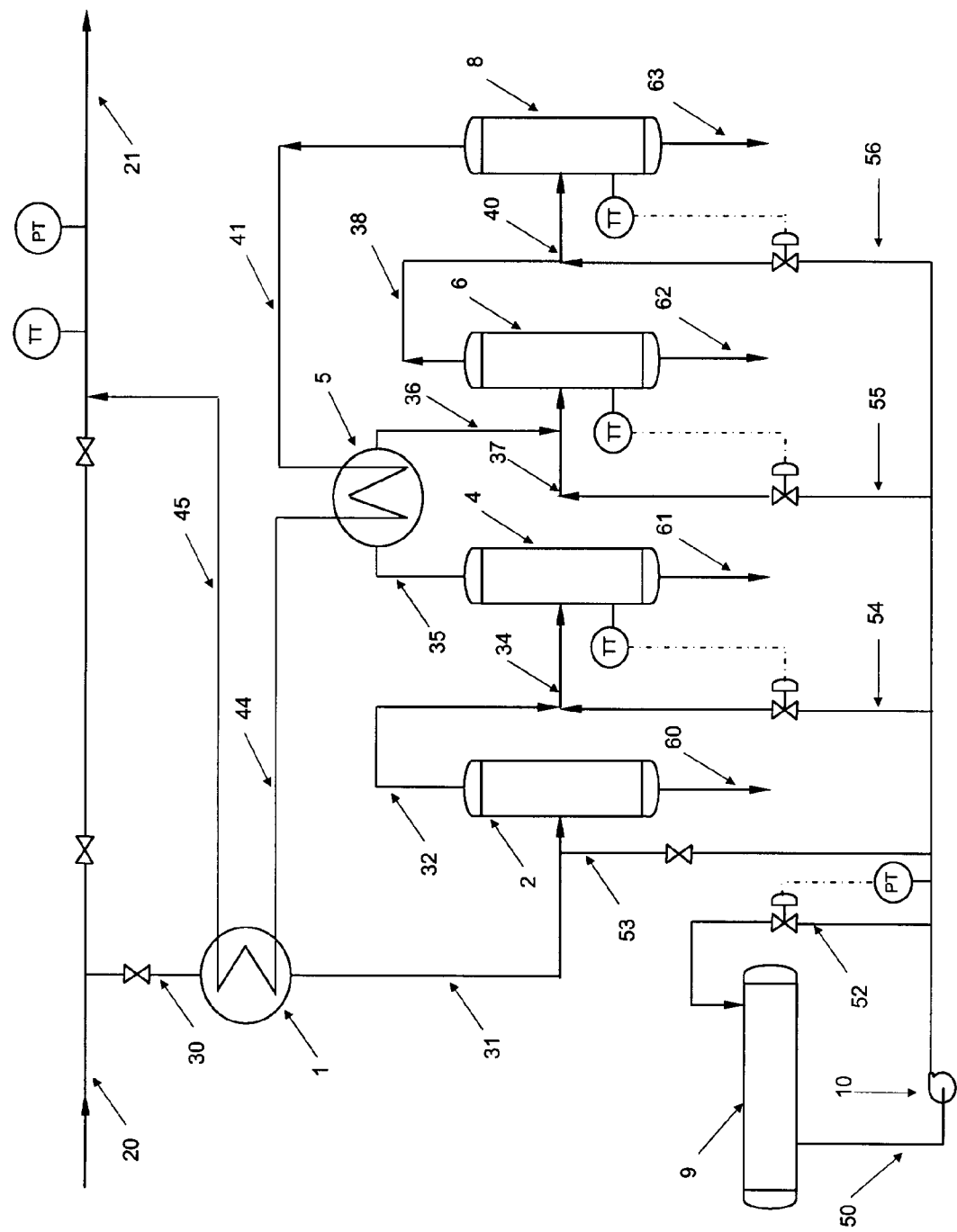
FIG. 2 is a schematic diagram showing a variation of the liquid natural gas direct cooling illustrated in FIG. 1.

Referring to FIG. 2, for the purpose of illustration it shows a separate arrangement where only two heat exchangers are used with four separation vessels. The reference numbers on the drawings remain the same, with the exception of the heat exchangers which have been eliminated.

Figure 3:
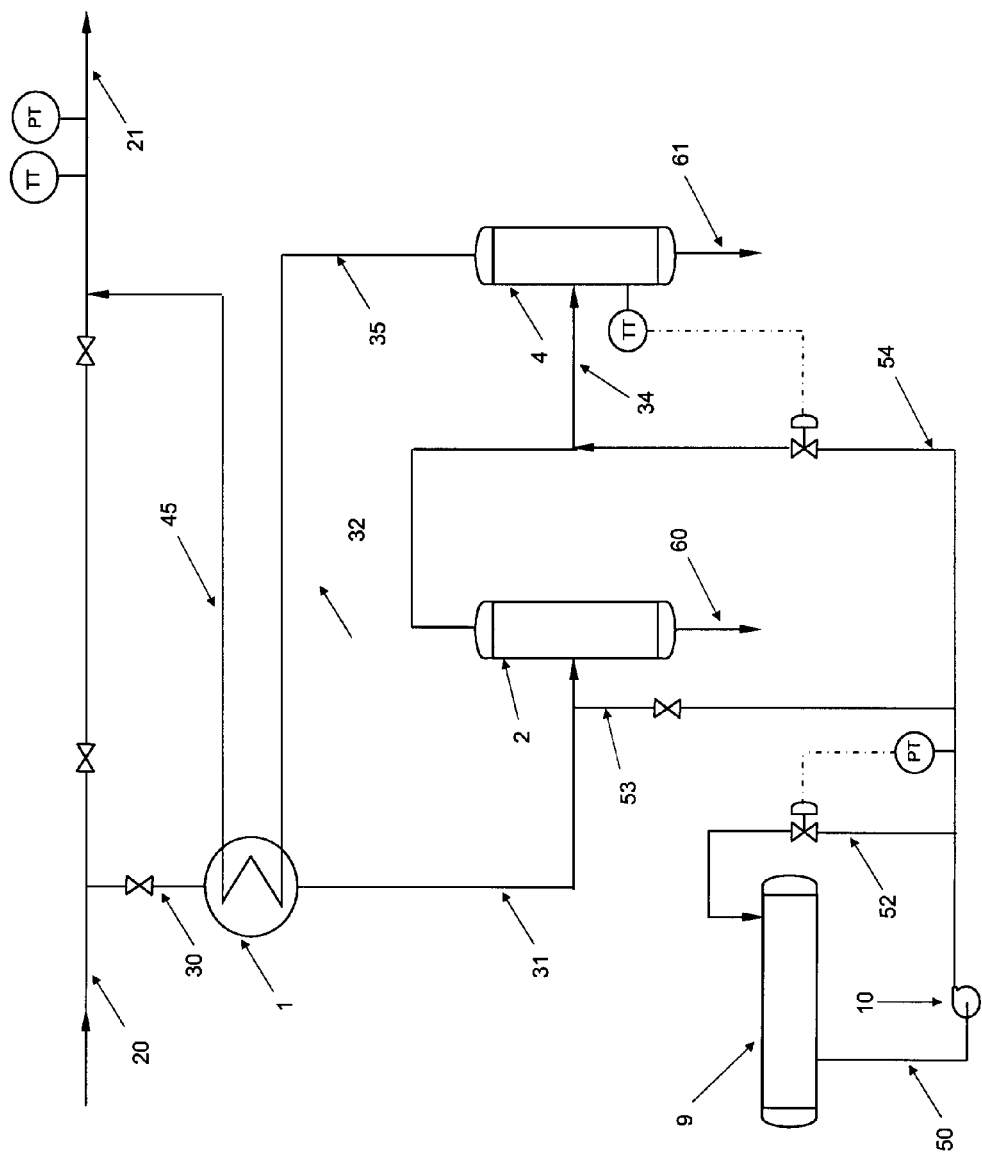
FIG. 3 is a schematic diagram showing another variation of the liquid natural gas direct cooling illustrated in FIG. 1.

FIG. 3 shows another arrangement with just two separators and a single heat exchanger. The reference numbers on the drawings remain the same, with the exception of the heat exchangers and separators which have been eliminated.

Figure 4:
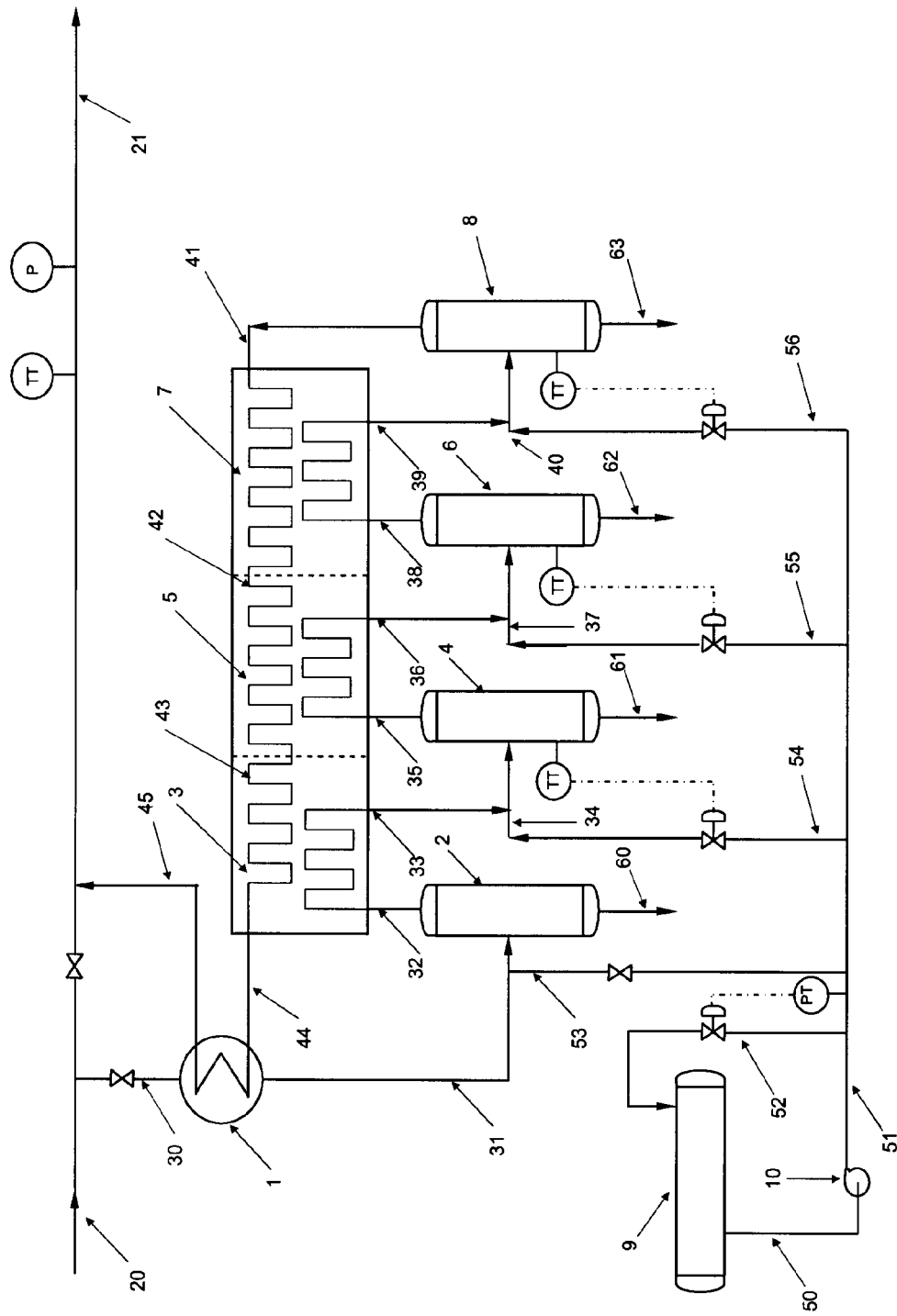
FIG. 4 is a schematic diagram showing a further variation of indirect cooling where a cold box is utilized in lieu of individual exchangers.

FIG. 4 shows yet another arrangement where a cold box heat exchanger is employed in lieu of singular heat exchangers.

These three figures basically demonstrate the various alternative arrangements including the ability to by-pass some heat exchangers and or separators to achieve a desired NGL extraction and hydrocarbon dew point. Those skilled in the art, can arrange and re-arrange the orientation of heat exchangers and separators that combined with direct mixing of LNG can achieve a desired NGL recovery rate and or hydrocarbon dew point control.

In the preferred method LNG provides the "cold energy" required to condense and extract the NGLs. The above described method uses this stored "cold energy" to condense "rich" gas by direct mixing. This direct mixing provides better heat transfer and eliminates the need for cryogenic and refrigeration plants to condense NGLs, it also eliminates the need for compressors to re-compress the "lean" gas since the LNG is pressurized by a pump and as the LNG gives up its cold energy it expands increasing the pressure. Moreover, it provides for a wide range of "turndown" operation. A typical straddle plant is designed to achieve high recoveries of all NGLs and the "turndown" to lower recoveries are difficult to obtain. The above method allows for ease of "turndown" by simply changing the temperature set point controller which then changes the LNG flow rate. As the LNG gives up its cold energy to condense the NGLs in the "rich" stream it becomes a "lean" gas ready for distribution.

Existing plants operate in a mode that recovers at least some percentage of all components, it is not generally possible to operate the plants to achieve a specific hydrocarbon dew point. Control of hydrocarbon dew point for gas transportation is critical due to the influence of ambient temperatures and pressure reductions during transportation that can cause liquid fallout. To reach higher extraction levels more expensive metallurgy, more compression, and more capital investment is required. According to the present invention there is provided a method for direct liquefaction and extraction of NGLs from natural gas. The first step is the pre-cooling in a heat exchanger of the incoming "rich" natural gas stream, containing methane, ethane, propane, butanes, pentanes, other heavier hydrocarbons, water and carbon dioxide with a countercurrent flow of "lean" natural gas. A second step involves the separation of, water and heavier hydrocarbons from lighter hydrocarbons in a series of separators by controlling the temperature at each separator with the addition of Liquid Natural Gas (LNG) upstream of each separator. A third step involves the addition of at least a heat exchanger between separators to recover cold energy. A fourth step involves the controlled addition of LNG for direct cooling upstream of each separator to selectively control the extraction of NGL's. A fifth step involves the ability to control gas pressure compressor free. This is achieved by expansion of LNG as it gains heat in the heat exchange. A sixth step it provides for ease of "turndown" to achieve high or low recoveries ratios between and Hydrocarbon Dew Point (HDC) control.

Advantages:

The use of the above described method at a straddle plant facility provides a number of distinct advantages over methods currently in use:

1. Existing systems expend energy to bring the pressure of the natural gas down to remove the natural gas liquids and then increasing the pressure of the natural gas back up in order to return the natural gas to the pipeline after processing. With the present method, the natural gas can be freed of the natural gas liquids without a change in pressure.
2. The heating value of the natural gas returning to the pipeline can be monitored. If necessary, the heating value can be increased by adding back in selected quantities of NGLs to maintain heating quality constant.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A method for selective extraction of natural gas liquids from "rich" natural gas, comprising the steps of:
    positioning a storage vessel for liquid natural gas (LNG) at a straddle plant facility that has a series of separators operating at different selected hydrocarbon dew points in order to condense different natural gas liquids (NGLs);
    mixing a rich natural gas stream entering a first of the separators with a stream of LNG from the storage vessel by direct mixing to lower a temperature of the rich natural gas stream to a selected hydrocarbon dew point for a selected natural gas liquid in order to condense the selected natural gas liquid in the rich natural gas stream, the entire rich natural gas stream after LNG addition entering the first separator, a remainder of the rich natural gas stream exiting the first separator, after removal of the selected natural gas liquid, passing to a subsequent one of the series of separators; and
    mixing the remainder of the rich natural gas stream sequentially entering each of the separators after removal of the selected natural gas liquid with a stream of LNG from the storage vessel by direct mixing to lower a temperature of the remainder of the rich natural gas stream to the selected hydrocarbon dew point in order to condense a next selected natural gas liquid in the remainder of the rich natural gas stream, the entire remainder of the rich natural gas stream after LNG addition entering each separator, the temperature of the rich natural gas stream being controlled by controlling addition of LNG to the rich natural gas stream, separation taking place sequentially with natural gas liquids having progressively lower hydrocarbon dew points.

2. A straddle plant, comprising:
    a storage vessel for liquid natural gas (LNG);
    a series of separators adapted to operate at different selected hydrocarbon dew points in order to condense different natural gas liquids (NGLs);
    a first mixing station for a first of the separators adapted to mix LNG from the storage vessel with a rich natural gas stream entering the first of the separators by direct mixing to lower a temperature of the rich natural gas stream to a selected hydrocarbon dew point for a selected natural gas liquid in order to condense the selected natural gas liquid in the rich natural gas stream, the entire rich natural gas stream after LNG addition entering the first separator, a remainder of the rich natural gas stream exiting the first separator, after removal of the selected natural gas liquid, passing to a subsequent one of the series of separators; and a mixing station for each subsequent separator adapted to mix LNG from the storage vessel with the remainder of the rich natural gas stream sequentially entering each subsequent separator, the entire remainder of the rich natural gas stream after LNG addition entering each separator, whereby a temperature of the rich natural gas stream is lowered to the selected hydrocarbon dew point in order to condense a next selected natural gas liquid carried in the remainder of the rich natural gas stream, the temperature of the remainder of the rich natural gas stream being controllable by addition of LNG to the remainder of the rich natural gas stream to just achieve the selected hydrocarbon dew point, separation taking place sequentially with natural gas liquids having progressively lower hydrocarbon dew points.

3. The method of claim 1, involving a further step of passing natural gas through a heat exchanger to effect a heat exchange with relatively colder natural gas prior to entering each separator, thereby reducing the amount of LNG addition required to achieve each hydrocarbon dew point.

4. A method for selective extraction of natural gas liquids from "rich" natural gas, comprising the steps of:

positioning a storage vessel for liquid natural gas (LNG) at a straddle plant facility that has a series of separators, including a heavier hydrocarbon fractions separator, a propane separator, a carbon dioxide separator, and an ethane separator operating at different selected hydrocarbon dew points in order to condense heavier hydrocarbon fractions, propane, carbon dioxide, and ethane, respectively;

mixing a rich natural gas stream entering the heavier hydrocarbon fractions separator with a stream of LNG from the storage vessel by direct mixing to lower a temperature of the rich natural gas stream to a selected hydrocarbon dew point for heavier hydrocarbon fractions in order to condense the heavier hydrocarbon fractions in the rich natural gas stream, the entire rich natural gas stream after LNG addition entering the heavier hydrocarbon fractions separator and a remainder of the rich natural gas stream exiting the heavier hydrocarbon fractions separator, after removal of heavier hydrocarbon fractions, passing to the propane separator;

mixing the remainder of the rich natural gas stream entering the propane separator with a stream of LNG from the storage vessel by direct mixing to lower a temperature of the remainder of the rich natural gas stream to a selected hydrocarbon dew point for propane in order to condense the propane in the remainder of the rich natural gas stream, the entire remainder of the rich natural gas stream after LNG addition entering the propane separator and the remainder of the rich natural gas stream exiting the propane separator, after removal of propane, passing to the carbon dioxide separator;

mixing the remainder of the rich natural gas stream entering the carbon dioxide separator with a stream of LNG from the storage vessel by direct mixing to lower a temperature of the remainder of the rich natural gas stream to a selected hydrocarbon dew point for carbon dioxide in order to condense the carbon dioxide in the remainder of the rich natural gas stream, the entire remainder of the rich natural gas stream after LNG addition entering the carbon dioxide separator and the remainder of the rich natural gas stream exiting the carbon dioxide separator, after removal of carbon dioxide, passing to the ethane separator; and mixing the remainder of the rich natural gas stream entering the ethane separator with a stream of LNG from the storage vessel by direct mixing to lower a temperature of the remainder of the rich natural gas stream to a selected hydrocarbon dew point for ethane in order to condense the ethane in the remainder of the rich natural gas stream, the entire remainder of the rich natural gas stream after LNG addition entering the ethane separator;

the temperature of the rich natural gas stream entering each separator being controlled by controlling addition of LNG.

5. The method of claim 4, involving a further step of passing natural gas through a heat exchanger to effect a heat exchange with relatively colder natural gas prior to entering each separator, thereby reducing the amount of LNG addition required to achieve each hydrocarbon dew point.

* * * * *